United States Patent
Yoneda et al.

(10) Patent No.: US 9,812,163 B2
(45) Date of Patent: Nov. 7, 2017

(54) SPINDLE MOTOR INCLUDING SEALING MEMBER AND DISK DRIVE APPARATUS PROVIDED WITH SAME

(71) Applicant: Nidec Corporation, Kyoto (JP)

(72) Inventors: Tomohiro Yoneda, Kyoto (JP); Hiroshi Kobayashi, Kyoto (JP); Masanobu Taki, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 15/176,308

(22) Filed: Jun. 8, 2016

(65) Prior Publication Data
US 2017/0025146 A1 Jan. 26, 2017

(30) Foreign Application Priority Data
Jul. 24, 2015 (JP) .................................. 2015-146263

(51) Int. Cl.
*G11B 19/20* (2006.01)
*H02K 5/16* (2006.01)
*H02K 15/14* (2006.01)

(52) U.S. Cl.
CPC ...... *G11B 19/2036* (2013.01); *G11B 19/2009* (2013.01); *H02K 5/16* (2013.01); *H02K 15/14* (2013.01)

(58) Field of Classification Search
CPC ........ H02K 15/14; H02K 5/124; H02K 21/22; H02K 5/1677; H02K 5/16; F16C 2370/12;

(Continued)

(56) References Cited

U.S. PATENT DOCUMENTS 7,088,023 B1 * 8/2006 Gomyo ................... F16C 35/02
310/40 R
7,830,049 B2 * 11/2010 Yoneda .............. G11B 19/2009
310/51

(Continued)

FOREIGN PATENT DOCUMENTS

JP 2002-64953 A 2/2002
JP 2002-310146 A 10/2002

(Continued)

OTHER PUBLICATIONS

Takahashi et al.; "Spindle Motor and Disk Drive Apparatus"; U.S. Appl. No. 15/046,760, filed Feb. 18, 2016.

(Continued)

*Primary Examiner* — Brian Miller
(74) *Attorney, Agent, or Firm* — Keating & Bennett, LLP (57) ABSTRACT

A motor includes a bearing mechanism including a shaft disposed along a center axis extending in a lengthwise direction, a sealing member disposed on a lower side of the bearing mechanism, a stationary portion including a base constituting a part of the housing, and a rotary portion rotating relative to the stationary portion about the center axis via the bearing mechanism. The base has a through hole defined therein so as to have a center aligned with the center axis and pass through the base in an axial direction. The bearing mechanism is fixed to the base in a first fixing region defined between an inner circumferential portion of the base and an outer circumferential portion of the bearing mechanism. The sealing member is fixed to the base in a second fixing region defined between the inner circumferential portion of the base and an outer circumferential portion of the sealing member. At least one of the first fixing region and the second fixing region includes a sealing region.

15 Claims, 10 Drawing Sheets

(58) Field of Classification Search
CPC .. G11B 19/2009; G11B 19/2036; G11B 17/08
See application file for complete search history.

(56) References Cited

U.S. PATENT DOCUMENTS

| | | | | |
|---|---|---|---|---|
| 8,593,756 B2* | 11/2013 | Sugi | ................... | G11B 19/2009 |
| | | | | 310/90 |
| 9,051,938 B2* | 6/2015 | Hirono | ................... | F04D 29/063 |
| 9,058,833 B1* | 6/2015 | Sugi | ........................ | H02K 15/14 |
| 9,190,880 B2* | 11/2015 | Sugi | ................... | G11B 33/1486 |
| 9,589,589 B2* | 3/2017 | Shiraishi | ................ | H02K 15/14 |
| 9,721,608 B2* | 8/2017 | Takahashi | .......... | G11B 19/2009 |
| 2005/0274018 A1* | 12/2005 | Gomyo | ................. | F16C 33/103 |
| | | | | 29/898.02 |
| 2006/0268453 A1* | 11/2006 | Watanabe | ............ | G11B 25/043 |
| | | | | 360/99.08 |
| 2008/0024024 A1* | 1/2008 | Tamaoka | ............. | H02K 5/1675 |
| | | | | 310/90 |
| 2008/0278850 A1* | 11/2008 | Yoneda | ................. | F16C 33/107 |
| | | | | 360/99.08 |
| 2010/0328819 A1* | 12/2010 | Shinji | ................ | G11B 19/2009 |
| | | | | 360/244 |
| 2012/0176700 A1* | 7/2012 | Shinji | ................... | G11B 25/043 |
| | | | | 360/97.21 |
| 2014/0147065 A1* | 5/2014 | Sugiki | ................... | F16C 17/026 |
| | | | | 384/107 |
| 2014/0355154 A1* | 12/2014 | Sugiki | ................ | G11B 19/2036 |
| | | | | 360/99.08 |

FOREIGN PATENT DOCUMENTS

| | | |
|---|---|---|
| JP | 2004-301154 A | 10/2004 |
| JP | 2004-364398 A | 12/2004 |
| JP | 2008-79421 A | 4/2008 |

OTHER PUBLICATIONS

Shiraishi; "Spindle Motor and Disk Drive Apparatus"; U.S. Appl. No. 15/180,249, filed Jun. 13, 2016.

* cited by examiner

SPINDLE MOTOR INCLUDING SEALING MEMBER AND DISK DRIVE APPARATUS PROVIDED WITH SAME

BACKGROUND OF THE INVENTION

1. Field of the Invention

An exemplary preferred embodiment of the disclosure relates to a spindle motor for a disk drive apparatus.

2. Description of the Related Art

A disk drive apparatus such as a hard disk drive apparatus has been required to control, for example, the rotation of a disk and the movement of a head more accurately with an increase in recording density of a disk. A hard disk drive (HDD) has an interior space filled with a low-density gas such as helium or hydrogen to reduce resistance to be applied to a disk and a head in rotating a spindle motor. This configuration reduces the vibrations of the disk and head and achieves highly accurate data recording.

One of known HDDs is equipped with a spindle motor (hereinafter, simply referred to as a "motor") that includes a base constituting a part of a housing of the HDD.

If the HDD is filled with helium or hydrogen of considerably small molecular weight, the gas is frequently leaked out of the housing through a clearance between members of the HDD. Consequently, the HDD has been required to seal the clearance, thereby preventing the passage of the gas more than before. The clearance is sealed with, for example, a rubber ball that prevents the passage of a gas. However, the use of a sealing member made of an elastic material such as rubber raises a possibility in that a helium gas is leaked through a slight clearance between the sealing member and a through hole. In addition, the helium gas has a small particle size and therefore escapes to the outside through the rubber ball in some cases.

SUMMARY OF THE INVENTION

An exemplary preferred embodiment of the disclosure provides a spindle motor used in a disk drive apparatus to drive a disk. The disk drive apparatus includes a housing defining an interior space. The spindle motor includes a bearing mechanism, a sealing member, a stationary portion, and a rotary portion. The bearing mechanism includes a shaft arranged along a center axis extending in a lengthwise direction. The sealing member has disposed on a lower side of the bearing mechanism. The stationary portion includes a base constituting a part of the housing. The rotary portion is arranged to rotate relative to the stationary portion about the center axis via the bearing mechanism. The base has a through hole defined therein so as to have a center aligned with the center axis and pass through the base in an axial direction. The bearing mechanism is fixed to the base in a first fixing region defined between an inner circumferential portion that defines the through hole in the base and an outer circumferential portion of the bearing mechanism. The sealing member is fixed to the base in a second fixing region defined between the inner circumferential portion of the base and an outer circumferential portion of the sealing member. At least one of the first fixing region and the second fixing region includes a sealing region where the through hole is closed.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

An exemplary motor and an exemplary disk drive apparatus will be described below. In the following description referring to the accompanying drawings, the upper side and lower side of a motor in a direction of a center axis of the motor will be simply referred to as "upper side" and "lower side", respectively. Moreover, a direction parallel to the center axis will be referred to as "axially" or "axial direction". A radial direction from the center axis will be simply referred to as "radially" or "radial direction". A circumferential direction about the center axis will be simply referred to as "circumferentially" or "circumferential direction". However, the directional definitions are not intended to limit the orientations of a motor and a disk drive apparatus in manufacturing and using the motor and the disk drive apparatus.

Figure 1:
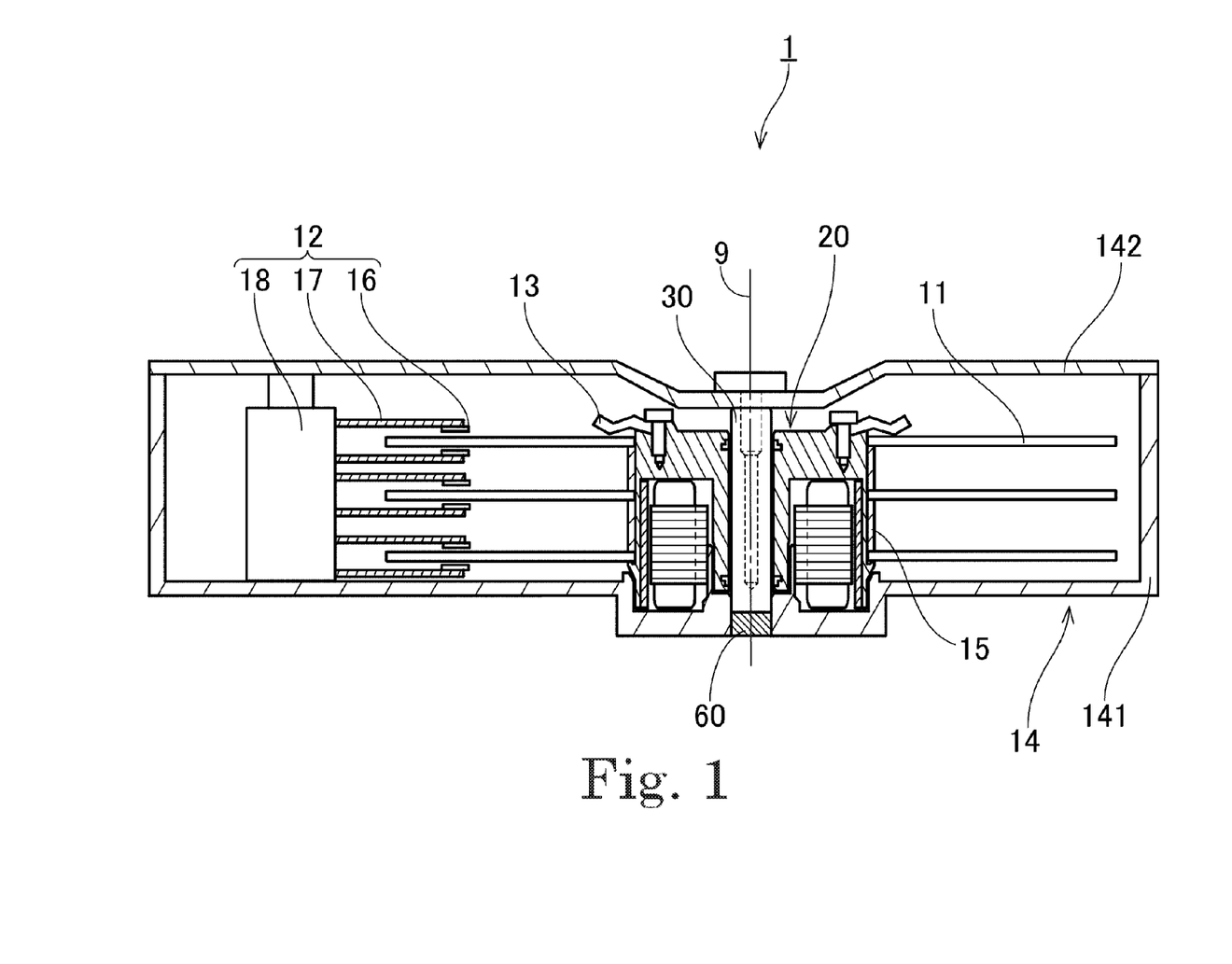
FIG. 1 is a longitudinal sectional view of a disk drive apparatus.

FIG. 1 is a longitudinal sectional view of a disk drive apparatus 1. The disk drive apparatus 1 is equipped with a motor 20 according to a first preferred embodiment. The disk drive apparatus 1 is arranged to read and write data from and to a magnetic disk while rotating the magnetic disk. As illustrated in FIG. 1, the disk drive apparatus 1 preferably includes three magnetic disks 11, an access unit 12, a clamper 13, and a housing 14 in addition to the motor 20.

The housing 14 preferably accommodates at least a part of the motor 20, the three magnetic disks 11, the clamper 13, and the access unit 12. The housing 14 includes a first housing member 141 of an open box shape and a second housing member 142 formed of a plate-like top cover. The housing 14 has an interior space formed therein in such a manner that the first housing member 141 and the second housing member 142 are bonded together by, for example, welding.

The interior space in the housing 14 is preferably a clean space where there is no or substantially no dirt or dust intrusion. In the disk drive apparatus 1, the housing 14 is preferably filled with a helium gas. The housing 14 may be filled with, for example, air, a hydrogen gas, or a nitrogen gas in place of the helium gas. The housing 14 may also be filled with a mixture of these gases.

The motor 20 rotates the three magnetic disks 11 about a center axis 9 while supporting the magnetic disks 11. The three magnetic disks 11 are arranged in the axial direction with a spacer 15 interposed therebetween. The three magnetic disks 11 are clamped by the clamper 13 and the motor 20. The access unit 12 preferably includes six heads 16, six arms 17 respectively supporting the heads 16, and a head movement mechanism 18. The heads 16 is arranged to read and write data to and from the corresponding magnetic disks 11 in proximity to the magnetic disks 11. The head movement mechanism 18 is arranged to actuate the arms 17 to move the heads 16 relative to the magnetic disks 11.

With this configuration, the heads 16 respectively access desired positions of the rotating magnetic disks 11 to read and write data from and to the magnetic disks 11. In the disk drive apparatus 1, the number of magnetic disks 11 may be one, two, or not less than four. The access unit 12 may perform at least one of data read from and data write to the magnetic disks 11. Examples of a disk to be employed herein may include an optical disk and the like in addition to a magnetic disk.

Figure 2:
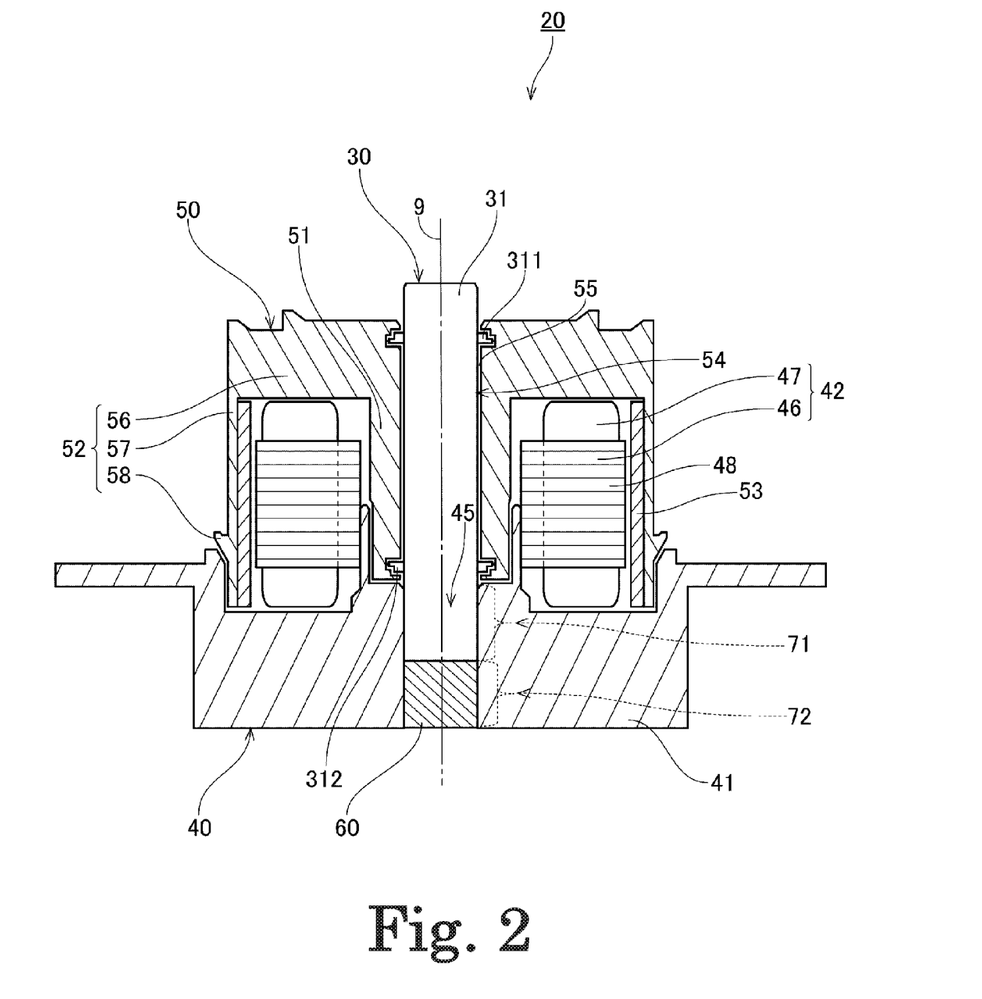
FIG. 2 is a longitudinal sectional view of a motor according to a first preferred embodiment.

Next, description will be given of a detailed configuration of the motor 20 for use in the disk drive apparatus 1. FIG. 2 is a longitudinal sectional view of the motor 20 according to the first preferred embodiment. The motor 20 is of a so-called outer rotor type in which a magnet is disposed radially outside a stator. The motor 20 preferably includes a bearing mechanism 30, a stationary portion 40, a rotary portion 50, and a sealing member 60.

The bearing mechanism 30 preferably includes a shaft 31 arranged in the axial direction, an upper thrust member 311 having a ring or substantially ring shape, and a lower thrust member 312 having a ring or substantially ring shape. The shaft 31 has a columnar shape and is arranged to extend along the center axis 9. The upper thrust member 311 is fixed to an outer circumferential surface of the shaft 31. The lower thrust member 312 is fixed to the outer circumferential surface of the shaft 31 below the upper thrust member 311.

The shaft 31 is made of, for example, aluminum, an aluminum alloy, or a stainless alloy. The shaft 31 may be subjected to heat treatment such as quenching. This heat treatment improves the hardness of the outer circumferential surface of the shaft 31. The outer circumferential surface of the shaft 31 may be coated with, for example, a nitride film or a hydrocarbon film. This coating imparts improved wear resistance to the outer circumferential surface of the shaft 31.

The stationary portion 40 stands still relative to the housing 14. The stationary portion 40 preferably includes a base 41 and a stator 42. As illustrated in FIG. 1, the base 41 is arranged to a part of the first housing member 141. The base 41 has a through hole 45 defined therein so as to have a center aligned with the center axis 9 and pass through the base 41 in the axial direction. The shaft 31 has a lower end fitted into the through hole 45. An outer circumferential portion of the shaft 31 and an inner circumferential portion that forms the through hole 45 in the base 41 may be fastened together by, for example, press fitting or shrinkage fitting. This fastening minimizes an interstice between the shaft 31 and the base 41.

The stator 42 preferably includes a stator core 46 and a plurality of coils 47. The stator core 46 is made of a magnetic material. The stator core 46 is fixed to the base 41. The stator core 46 has a plurality of teeth 48 protruding outward in the radial direction. The coil 47 is an aggregate of wires wound around the respective teeth 48. Each of the teeth 48 has a surface preferably covered with, for example, an insulating coat or a member made of an insulating material. Each of the wires is wound around the corresponding tooth 48 with an insulating coat or a member made of an insulating material.

The rotary portion 50 is supported by the bearing mechanism 30 so as to rotate relative to the stationary portion 40 about the center axis 9 of the motor 20. The rotary portion 50 preferably includes a sleeve 51, a hub 52, and a magnet 53. The sleeve 51 has a tubular or substantially tubular shape and is arranged to extend axially around the bearing mechanism 30. The sleeve 51 has a center through hole 54 arranged therein so as to pass through the sleeve 51 in a lengthwise direction. At least a part of the bearing mechanism 30 is accommodated in the center through hole 54.

A lubricant 55 is applied between the bearing mechanism 30 and the sleeve 51. The sleeve 51 is supported by the bearing mechanism 30 via the lubricant 55 so as to rotate relative to the bearing mechanism 30. The rotary portion 50 may be supported by, for example, a ball bearing or a sliding bearing in place of the fluid dynamic bearing so as to rotate relative to the stationary portion 40.

The hub 52 is arranged radially outside the sleeve 51. The hub 52 is made of a non-ferromagnetic metal such as an aluminum alloy.

The hub 52 preferably has an upper plate portion 56, a cylindrical portion 57, and a disk mount portion 58. The upper plate portion 56 annularly extends at an upper side of the stator 42. The upper plate portion 56 extends outward in the radial direction from an upper end of the sleeve 51. The cylindrical portion 57 has a tubular or substantially tubular shape and is arranged to extend downward from a radially outer end of the upper plate portion 56. In other words, the upper plate portion 56 is arranged to extend inward in the radial direction from an upper end of the cylindrical portion 57. In the first preferred embodiment, the sleeve 51 and the upper plate portion 56 (i.e., the hub 52) are formed integrally with each other. However, the sleeve 51 and the upper plate portion 56 (i.e., the hub 52) may be independent of each other as separate members.

The disk mount portion 58 has a ring or substantially ring shape and is arranged to extend outward in the radial direction from an outer circumferential surface of the cylindrical portion 57. As illustrated in FIG. 2, the disk mount portion 58 is arranged to protrude outward in the radial direction from a lower side of the cylindrical portion 57. As illustrated in FIG. 1, the lower one of the three magnetic disks 11 has a lower surface which is in contact with at least a part of a ring-shaped upper surface of the disk mount portion 58 in the axial direction. In other words, the upper surface of the disk mount portion 58 serves as a disk mount surface.

The magnet 53 has a cylindrical or substantially cylindrical shape and is fixed to an inner side of the cylindrical portion 57. The magnet 53 has an inner circumferential surface on which the north poles and the south poles are alternately magnetized in the circumferential direction. The inner circumferential surface of the magnet 53 is arranged opposite radially outer end surfaces of the teeth 48 in the radial direction with an interstice defined between the magnet 53 and the respective teeth 58. In other words, the magnet 53 has a magnetic pole surface disposed opposite the stator 42 in the radial direction.

In the motor 20, when a drive current is fed to the coil 47, magnetic fluxes generate at the teeth 48. By the action of magnetic fluxes between the respective teeth 48 and the magnet 53, torque generates between the stationary portion 40 and the rotary portion 50 in the circumferential direction. Thus, the rotary portion 50 rotates relative to the stationary portion 40 about the center axis 9. The magnetic disks 11 supported by the hub 52 also rotate together with the rotary portion 50 about the center axis 9.

At least a part of the sealing member 60 is disposed inside the through hole 45. The sealing member 60 closes the through hole 45 at a lower side of the bearing mechanism 30. This configuration contributes to preventing the gas from being leaked out of the housing 14 through the through hole 45. The sealing member 60 is made of a metal such as aluminum or an aluminum alloy.

Figure 3:
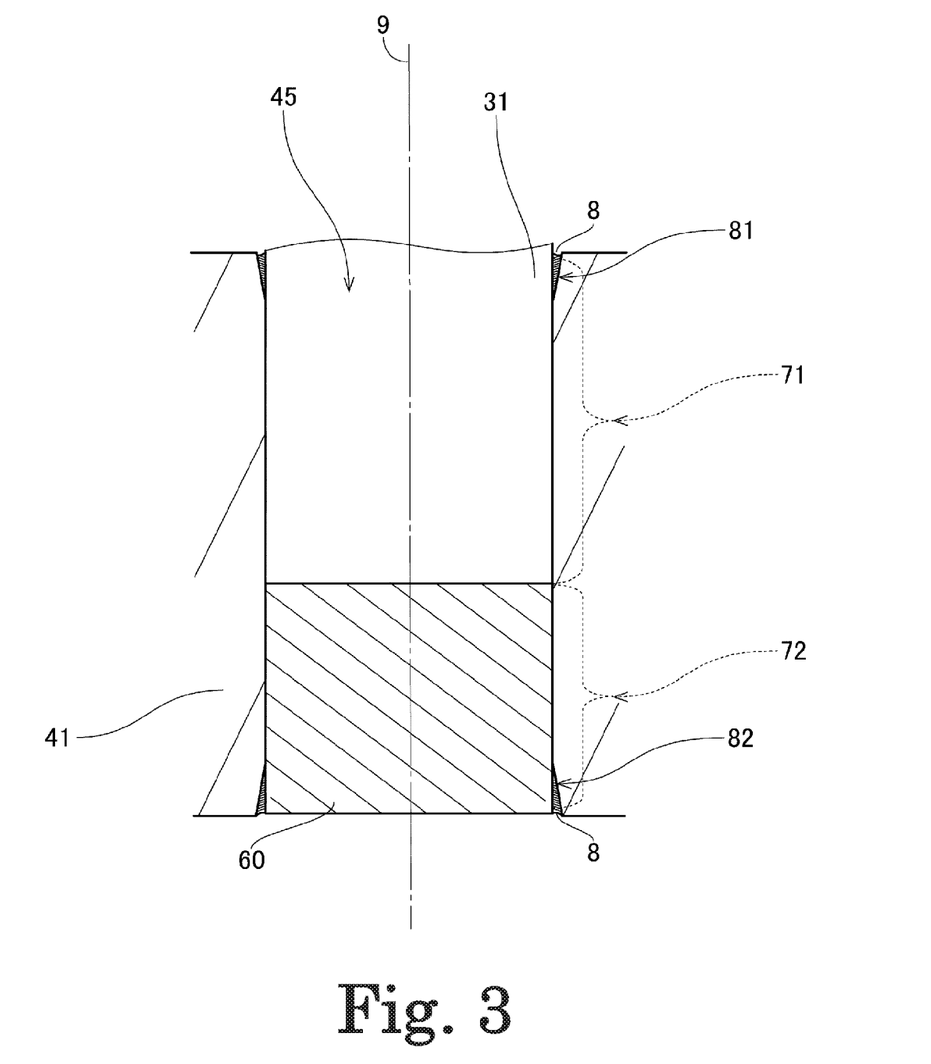
FIG. 3 is an enlarged sectional view of and around a through hole in the motor according to the first preferred embodiment.

FIG. 3 is an enlarged sectional view of and around the through hole 45 in the motor 20 according to the first preferred embodiment. A first fixing region 71 is defined between the outer circumferential portion of the shaft 31 and the inner circumferential portion that forms the through hole 45 in the base 41. In the first fixing region 71, the bearing mechanism 30 is fixed to the base 41. The first fixing region 71 may include a first sealing region 81. The first sealing region 81 is circumferentially applied with an adhesive 8. In the first sealing region 81, the adhesive 8 blocks the clearance between the outer circumferential portion of the bearing mechanism 30 and the inner circumferential portion of the base 41. The clearance between the outer circumferential portion of the bearing mechanism 30 and the inner circumferential portion of the base 41 is of an annular shape at the upper side. The clearance is circumferentially closed with the adhesive 8, so that the first sealing region 81 is defined. In other words, the first sealing region 81 is defined between the outer circumferential portion of the shaft 31 and the inner circumferential portion that forms the through hole 45 in the base 41. The annular clearance between the outer circumferential portion of the bearing mechanism 30 and the inner circumferential portion of the base 41 at the upper side has a radial dimension gradually decreased toward the lower side in the axial direction. In other words, at least one of the outer circumferential portion of the bearing mechanism 30 and the inner circumferential portion of the base 41 is tapered with respect to the center axis 9. In the clearance, a radial length between the outer circumferential portion of the bearing mechanism 30 and the inner circumferential portion of the base 41 is gradually shortened toward the lower side in the axial direction. The adhesive 8 is adequately distributed throughout the clearance by the capillary action. With this configuration, the adhesive 8 prevents the gas from being leaked out of the housing 14 through the clearance between the outer circumferential portion of the shaft 31 and the inner circumferential portion of the base 41. In FIG. 3, the first sealing region 81 is defined on an upper end of the first fixing region 71.

A second fixing region 72 is defined between an outer circumferential portion of the sealing member 60 and the inner circumferential portion that forms the through hole 45 in the base 41. In the second fixing region 72, the sealing member 60 is fixed to the base 41. The second fixing region 72 is circumferentially applied with the adhesive 8. The second fixing region 72 may include a second sealing region 82 defined between the outer circumferential portion of the sealing member 60 and the inner circumferential portion of the base 41. The clearance between the outer circumferential portion of the sealing member 60 and the inner circumferential portion of the base 41 is of a ring shape at the lower side. The clearance is circumferentially closed with the adhesive 8, so that the second sealing region 82 is defined. In other words, the second sealing region 82 is defined between the outer circumferential portion of the sealing member 60 and the inner circumferential portion that forms the through hole 45 in the base 41. The ring-shaped clearance between the outer circumferential portion of the sealing member 60 and the inner circumferential portion of the base 41 at the lower side has a radial dimension gradually decreased toward the upper side in the axial direction. In other words, at least one of the outer circumferential portion of the sealing member 60 and the inner circumferential portion of the base 41 is tapered with respect to the center axis 9. In the clearance, a radial length between the outer circumferential portion of the sealing member 60 and the inner circumferential portion of the base 41 is gradually shortened toward the upper side in the axial direction. The adhesive 8 is adequately distributed throughout the clearance by the capillary action. With this configuration, the adhesive 8 prevents the gas from being leaked out of the housing 14 through the minute clearance between the outer circumferential portion of the sealing member 60 and the inner circumferential portion of the base 41. In FIG. 3, the second sealing region 82 is defined on a lower end of the second fixing region 72.

As described above, at least one of the first fixing region 71 and the second fixing region 72 is circumferentially applied with the adhesive 8. This configuration prevents the gas from being leaked out of the housing 14 through the through hole 45. In addition, the first sealing region 81 circumferentially applied with the adhesive 8 is defined on the first fixing region 71 or the second sealing region 82 circumferentially applied with the adhesive 8 is defined on the second fixing region 72. This configuration also prevents the gas from being leaked out of the housing 14 through the through hole 45. A sealing region may be defined by welding in place of the first sealing region 81 defined using the adhesive and the second sealing region 82 defined using the adhesive.

The adhesive 8 is preferably a thermosetting epoxy adhesive. Alternatively, the adhesive 8 may be, for example, an anaerobic adhesive or an ultraviolet curable adhesive.

Figure 4:
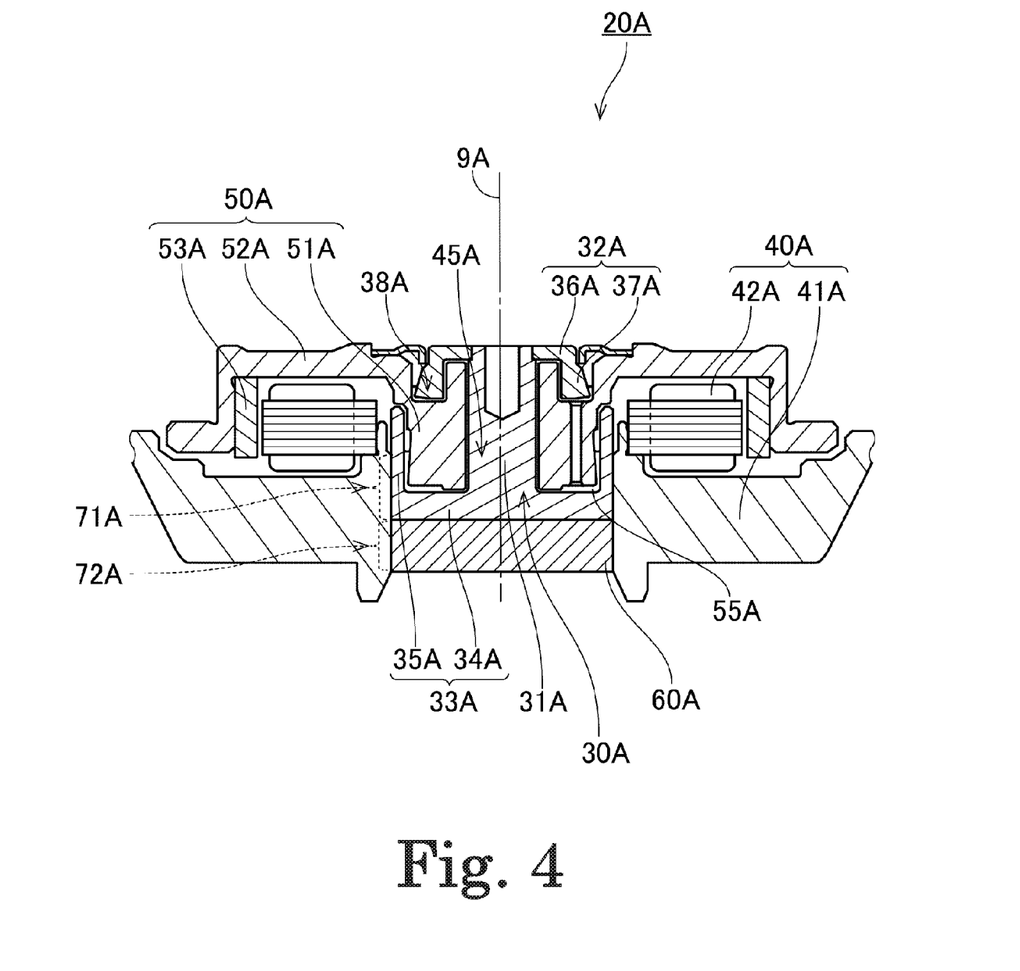
FIG. 4 is a longitudinal sectional view of a motor according to a second preferred embodiment.

FIG. 4 is a longitudinal sectional view of a motor 20A according to a second preferred embodiment. The motor 20A is of an outer rotor type for use in, for example, a disk drive apparatus. The motor 20A includes a bearing mechanism 30A, a stationary portion 40A, a rotary portion 50A, and a sealing member 60A. The rotary portion 50A rotates relative to the stationary portion 40A about a center axis 9A. The rotary portion 50A includes a sleeve 51A, a hub 52A, and a magnet 53A.

The stationary portion 40A includes a base 41A and a stator 42A. The base 41A constitutes a part of a housing of a disk drive apparatus that includes the motor 20A. The base 41A has a through hole 45A formed therein so as to have a center aligned with the center axis 9A and pass through the base 41A in the axial direction. The bearing mechanism 30A has a lower end fitted into the through hole 45A. In the following, similar configurations of the motor 20A to the configurations of the motor 20 according to the first preferred embodiment will not be described.

The bearing mechanism 30A includes a shaft 31A, an upper cup 32A, a lower cup 33A, and a lubricant 55A. The lower cup 33A has a first bottom portion 34A and a wall portion 35A. The shaft 31A is of a columnar shape and extends along the center axis 9A. The first bottom portion 34A is of a plate shape and extends outward in the radial direction from a lower portion of the shaft 31A. The wall portion 35A is of a cylindrical shape and extends upward in the axial direction from an outer edge of the first bottom portion 34A. The lower cup 33A has a longitudinal section of an almost L shape formed from the first bottom portion 34A and the wall portion 35A. In the motor 20A, the shaft 31A and the lower cup 33A are integrally formed with each other. However, the shaft 31A and the lower cup 33A may be independent of each other as separate members.

The upper cup 32A has a plate portion 36A and a tube portion 37A. The plate portion 36A is of a discus shape and extends outward in the radial direction from the shaft 31A. The plate portion 36A is fixed to an outer circumferential surface of the shaft 31A. The tube portion 37A is of a cylindrical shape and extends downward in the axial direction from an outer edge of the plate portion 36A. The upper cup 32A has a longitudinal section of an almost L shape formed from the plate portion 36A and the tube portion 37A.

The shaft 31A is inserted into a radially inner side of the sleeve 51A of the rotary portion 50A. The sleeve 51A is inserted into a radially inner side of the wall portion 35A of the lower cup 33A. The sleeve 51A has an upper surface in which an annular recess 38A is formed. The annular recess 38A is of a ring shape and extends downward from the upper surface of the sleeve 51A. The annular recess 38A receives the tube portion 37A of the upper cup 32A.

The lubricant 55A is applied to a minute interstice between the sleeve 51A and each of the shaft 31A, the upper cup 32A, and the lower cup 33A. The lubricant 55A has an upper interface formed between an outer circumferential surface of the tube portion 37A of the upper cup 32A and an inner circumferential surface that defines the annular recess 38A in the sleeve 51A. The lubricant 55A also has a lower interface formed between an inner circumferential surface of the wall portion 35A of the lower cup 33A and an outer circumferential surface of the sleeve 51A. With this configuration, the rotary portion 50A including the sleeve 51A is supported by the shaft 31A, the upper cup 32A, and the lower cup 33A via the lubricant 55A so as to rotate relative to the shaft 31A, the upper cup 32A, and the lower cup 33A.

At least a part of the sealing member 60A is disposed inside the through hole 45A. The sealing member 60A blocks the through hole 45A at a lower side of the bearing mechanism 30A. Also in the motor 20A, this configuration prevents a gas from being leaked out of the housing of the disk drive apparatus through a minute clearance between an outer circumferential portion of the lower cup 33A and an inner circumferential portion of the base 41A.

A first fixing region 71A where the lower cup 33A is fixed to the base 41A is defined between the outer circumferential portion of the lower cup 33A and the inner circumferential portion that forms the through hole 45A in the base 41A. Moreover, a second fixing region 72A where the sealing member 60A is fixed to the base 41A is defined between an outer circumferential portion of the sealing member 60A and the inner circumferential portion that forms the through hole 45A in the base 41A. At least one of the first fixing region 71A and the second fixing region 72A includes a sealing region circumferentially applied with an adhesive for blocking the through hole 45A. Also in the motor 20A, this configuration prevents the gas from being leaked out of the housing of the disk drive apparatus through the minute clearance between the outer circumferential portion of the lower cup 33A and the inner circumferential portion of the base 41A. At least one of the first fixing region 71A and the second fixing region 72A may include a sealing region defined by welding. When the minute clearance is closed by welding, the gas is not leaked out of the housing.

Figure 5:
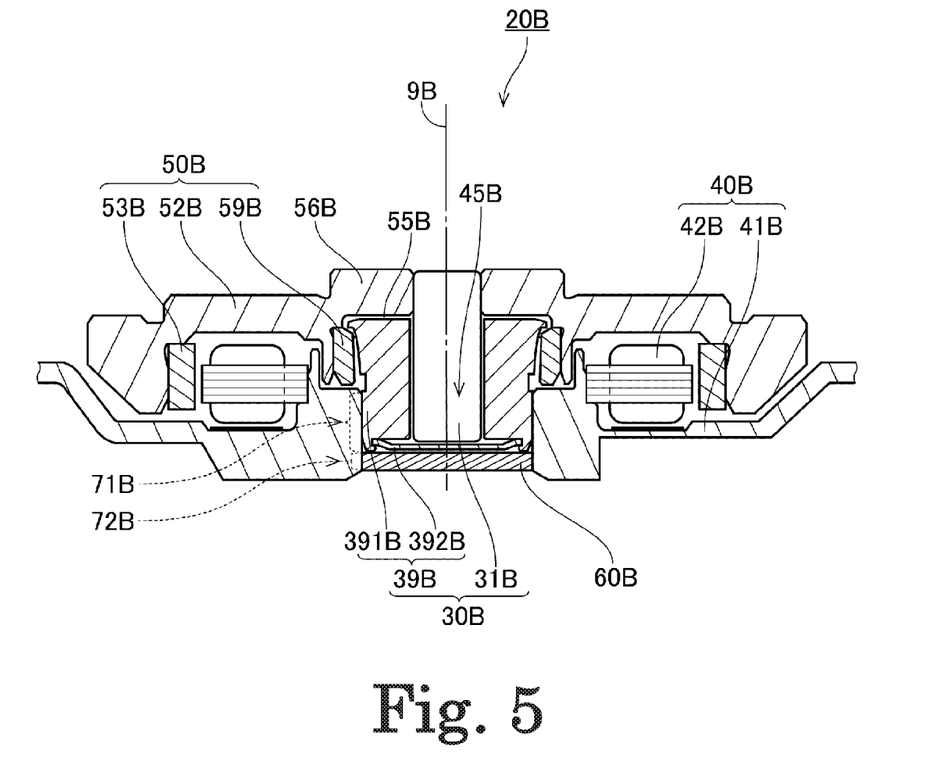
FIG. 5 is a longitudinal sectional view of a motor according to a third preferred embodiment.

FIG. 5 is a longitudinal sectional view of a motor 20B according to a third preferred embodiment. The motor 20B is of an outer rotor type for use in, for example, a disk drive apparatus. The motor 20B includes a bearing mechanism 30B, a stationary portion 40B, a rotary portion 50B, and a sealing member 60B. The rotary portion 50B rotates relative to the stationary portion 40B about a center axis 9B. In the following, similar configurations of the motor 20B to the configurations of the motor 20 according to the first preferred embodiment will not be described.

The stationary portion 40B includes a base 41B and a stator 42B. The base 41B constitutes a part of a housing of a disk drive apparatus that includes the motor 20B. The base 41B has a through hole 45B formed therein so as to have a center aligned with the center axis 9B and pass through the base 41B in the axial direction. The bearing mechanism 30B has a lower end fitted into the through hole 45B. The rotary portion 50B includes a hub 52B, a magnet 53B, and an annular member 59B.

The bearing mechanism 30B includes a shaft 31B and a stationary bearing unit 39B. The shaft 31B is of a columnar shape and extends along the center axis 9B. The shaft 31B has an upper portion fixed to an inner end of an upper plate portion 56B of the hub 52B. With this configuration, the shaft 31B rotates relative to the stationary portion 40B in conjunction with the rotary portion 50B.

The stationary bearing unit 39B includes a sleeve 391B and a cap 392B. The sleeve 391B is of an almost cylindrical shape and axially extends around the shaft 31B. The sleeve 391B has a lower portion accommodated in the through hole 45B in the base 41B.

An inner circumferential surface of the base 41B and an outer circumferential surface of the sleeve 391B are preferably fixed to each other by insertion and adhesion. The inner circumferential surface of the sleeve 391B is disposed opposite the outer circumferential surface of the shaft 31B in the radial direction. The cap 392B blocks a lower opening in the sleeve 391B.

A lubricant 55B is applied to a minute interstice between the stationary bearing unit 39B and each of the shaft 31B, the upper plate portion 56B of the hub 52B, and the annular member 59B. The lubricant 55B has an interface formed between the sleeve 391B and the annular member 59B. With this configuration, the shaft 31B, the hub 52B, and the annular member 59B are supported by the stationary bearing unit 39B via the lubricant 55B so as to rotate relative to the stationary bearing unit 39B.

At least a part of the sealing member 60B is disposed inside the through hole 45B. The sealing member 60B blocks the through hole 45B at a lower side of the bearing mechanism 30B. Also in the motor 20B, this configuration prevents a gas form being leaked out of the housing of the disk drive apparatus through a minute clearance between an outer circumferential portion of the sleeve 391B and an inner circumferential portion of the base 41B.

A first fixing region 71B where the sleeve 391B is fixed to the base 41B is defined between the outer circumferential portion of the sleeve 391B and the inner circumferential portion that forms the through hole 45B in the base 41B. Moreover, a second fixing region 72B where the sealing member 60B is fixed to the base 41B is defined between an outer circumferential portion of the sealing member 60B and the inner circumferential portion that forms the through hole 45B in the base 41B. At least one of the first fixing region 71B and the second fixing region 72B includes a sealing region circumferentially applied with an adhesive for blocking the through hole 45B. Also in the motor 20B, this configuration prevents the gas from being leaked out of the housing of the disk drive apparatus through the minute clearance between the outer circumferential portion of the sleeve 391B and the inner circumferential portion of the base 41B. At least one of the first fixing region 71B and the second fixing region 72B may include a sealing region defined by welding. When the clearance is sealed by welding, the gas is not leaked out of the housing.

The foregoing description concerns the exemplary preferred embodiments of the disclosure; however, the present invention is not limited to the foregoing preferred embodiments.

Figure 6:
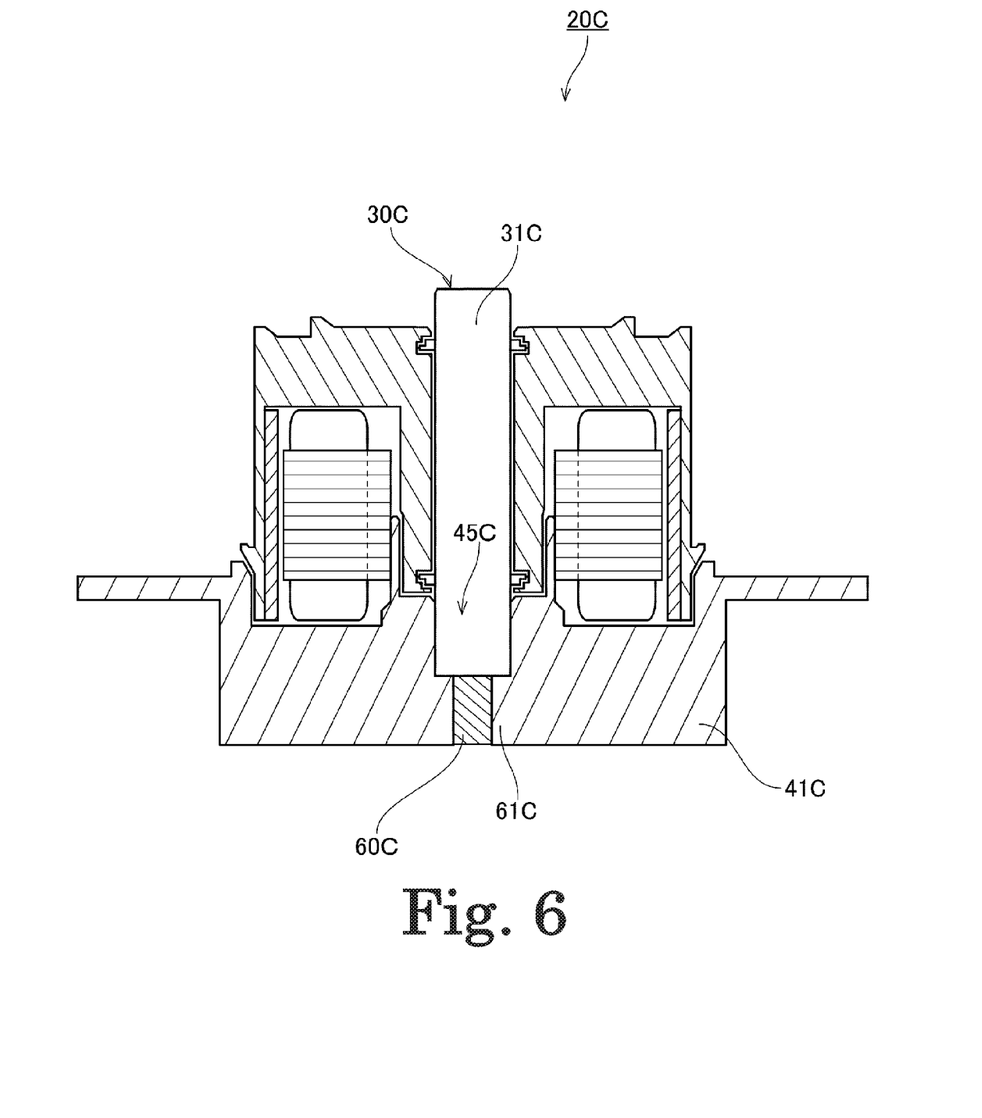
FIG. 6 is a longitudinal sectional view of a motor according to a first preferred modification.

FIG. 6 is a longitudinal sectional view of a motor 20C according to a first modification. In the motor 20C, an inner circumferential portion that forms a through hole 45C in a base 41C has, at a lower surface side, an annular protrusion 61C protruding inward in the radial direction. In the motor 20C, an outer diameter of a sealing member 60C is smaller than an outer diameter of a shaft 31C of a bearing mechanism 30C. The sealing member 60C is fixed in such a manner that an outer circumferential portion thereof is fitted into an inner circumferential portion of the protrusion 61C. As described above, the reduction in lower opening area of the through hole 45C leads to a reduction in area of a clearance between the outer circumferential portion of the sealing member 60C and the inner circumferential portion of the base 41C. Accordingly, this configuration decreases the amount of gas passing through the clearance between the outer circumferential portion of the sealing member 60C and the inner circumferential portion of the base 41C. This configuration reduces a leakage of gas from a housing. With regard to the motor 20C, configurations other than the configuration described above are the same as the configurations of the motor 20 according to the first preferred embodiment; therefore, the description thereof will not be given here.

Figure 7:
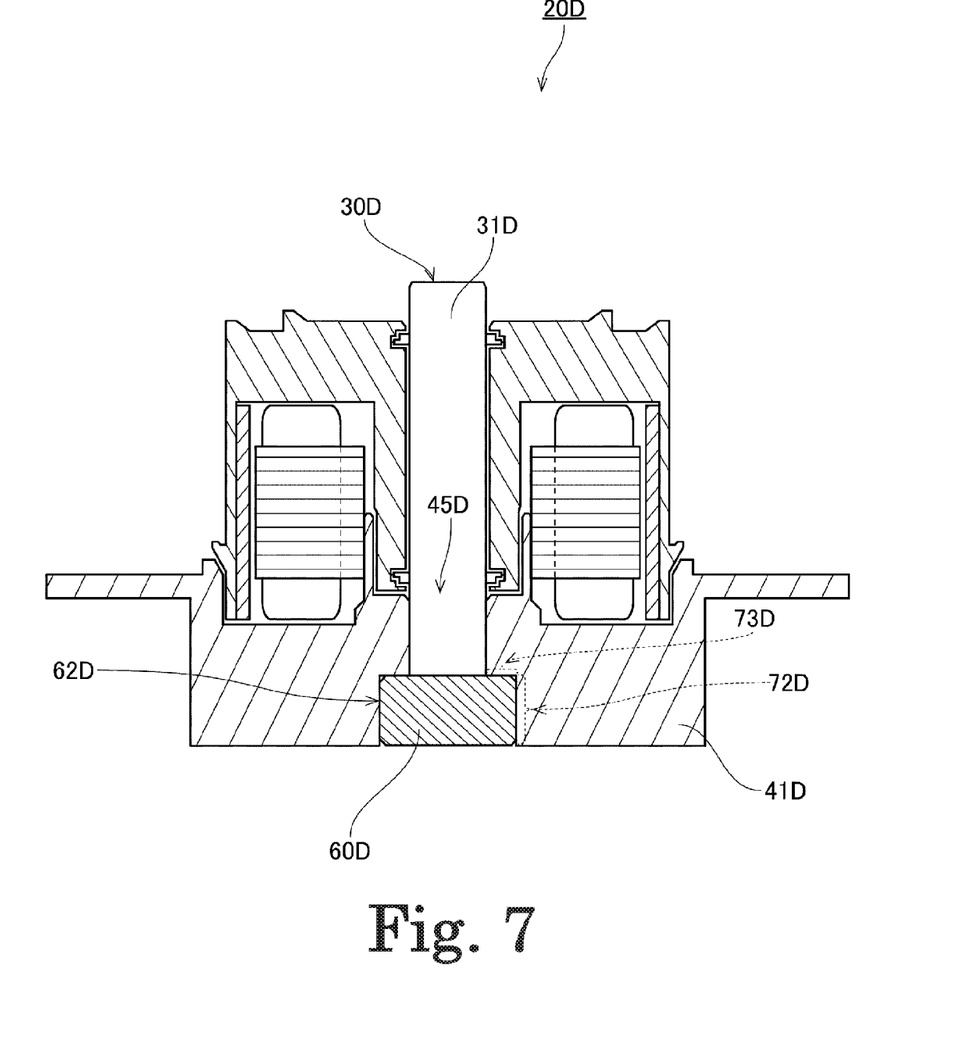
FIG. 7 is a longitudinal sectional view of a motor according to a second preferred modification.

FIG. 7 is a longitudinal sectional view of a motor 20D according to a second modification. In the motor 20D, an inner circumferential portion that forms a through hole 45D in a base 41D has, at a lower surface side of the base 41D, an annular first recess 62D extending outward in the radial direction. An outer diameter of a sealing member 60D is larger than an outer diameter of a shaft 31D of a bearing mechanism 30D. The sealing member 60D has an outer circumferential portion fitted into an inner circumferential portion of the first recess 62D. The outer circumferential portion of the sealing member 60D is fixed to the inner circumferential portion of the first recess 62D in a second fixing region 72D.

In the through hole 45D, thus, an upper surface of the sealing member 60D is in contact with the base 41D. This configuration leads to an increase in contact area between the sealing member 60D and the base 41D. The increase in contact area reduces a leakage of gas from a housing. With regard to the motor 20D, configurations other than the configuration described above are similar to the configurations of the motor 20 according to the first preferred embodiment; therefore, the description thereof will not be given here.

Figure 8:
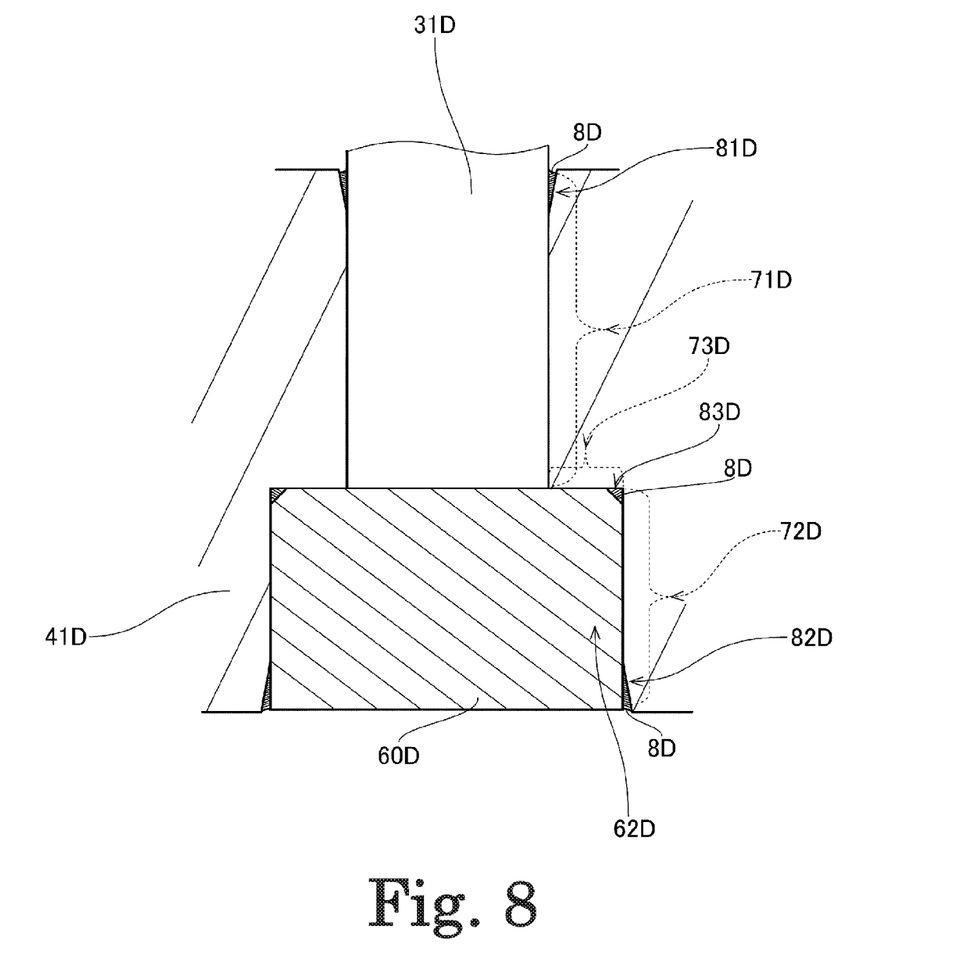
FIG. 8 is an enlarged sectional view of and around a through hole in the motor according to the second preferred modification.

FIG. 8 is an enlarged sectional view of and around the through hole 45D in the motor 20D. The second fixing region 72D may include a second sealing region 82D. The second fixing region 72D is circumferentially applied with an adhesive 8D. In the second fixing region 72D, the adhesive 8D blocks a clearance between the outer circumferential portion of the sealing member 60D and the inner circumferential portion that forms the through hole 45D in the base 41D. A first fixing region 71D where the bearing mechanism 30D is fixed is defined between an outer circumferential portion of the bearing mechanism 30D and the inner circumferential portion that forms the through hole 45D in the base 41D. The first fixing region 71D may include a first sealing region 81D. The first sealing region 81D is circumferentially applied with the adhesive 8D. In the first sealing region 81D, the adhesive 8D blocks a clearance between the outer circumferential portion of the bearing mechanism 30D and the inner circumferential portion that forms the through hole 45D in the base 41D.

A third fixing region 73D where the sealing member 60D is fixed is also defined between an upper surface of the sealing member 60D and an axially downward surface of the first recess 62D. The third fixing region 73D may include a third sealing region 83D. The third fixing region 73D is circumferentially applied with the adhesive 8D. In the third fixing region 73D, the adhesive 8D blocks a clearance between the upper surface of the sealing member 60D and the axially downward surface of the first recess 62D. The third sealing region 83D is defined in such a manner that the adhesive 8D is applied to the entire circumference of the ring-shaped clearance between the upper surface of the sealing member 60D and the axially downward surface of the first recess 62D. This configuration reduces the leakage of gas from the housing.

Figure 9:
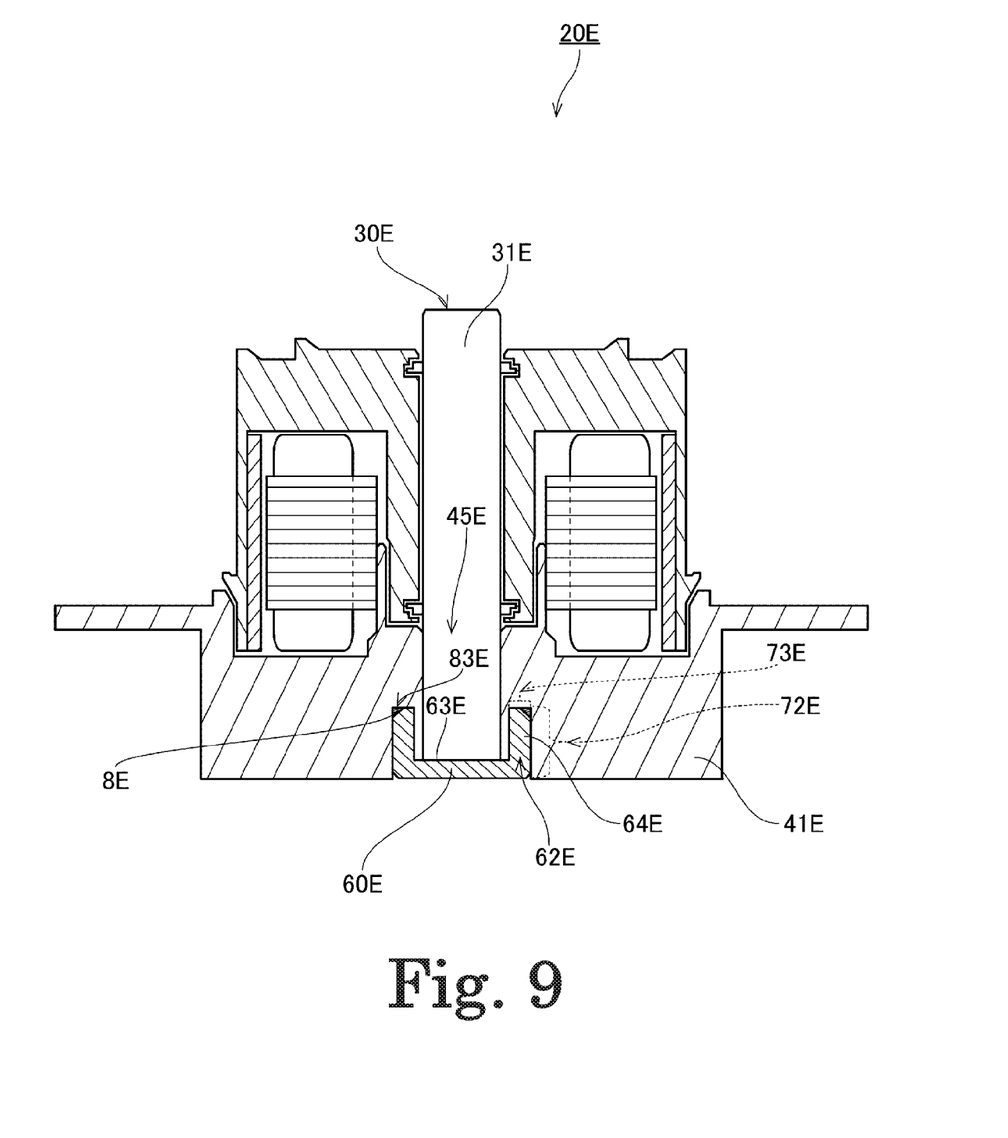
FIG. 9 is a longitudinal sectional view of a motor according to a third preferred modification.

FIG. 9 is a longitudinal sectional view of a motor 20E according to a third modification. In the motor 20E, an inner circumferential portion of a through hole 45E has, at a lower surface side of a base 41E, an annular second recess 62E extending outward in the radial direction and upward in the axial direction. In the motor 20E, a sealing member 60E includes a flat plate portion 63E of a discus shape and an annular tube portion 64E extending from an end of the flat plate portion 63E in the axial direction. At least a part of the annular tube portion 64E is fitted into the second recess 62E. The annular tube portion 64E receives a lower end of a shaft 31E of a bearing mechanism 30E. In a second fixing region 72E, an outer circumferential portion of the annular tube portion 64E is fixed to the inner circumferential portion that forms the through hole 45E in the base 41E. The sealing member 60E is of a cup shape which leads to an increase in contact area between the sealing member 60E and the base 41E. Accordingly, this configuration reduces a leakage of gas from a housing.

Also in the motor 20E, a third fixing region 73E where the sealing member 60E is fixed is defined between an upper surface of the annular tube portion 64E and an axially downward surface of the second recess 62E. The third fixing region 73E may include a third sealing region 83E. The third sealing region 83E is circumferentially applied with an adhesive 8E. In the third sealing region 83E, the adhesive 8E blocks a ring-shaped clearance between the upper surface of the annular tube portion 64E and the axially downward surface of the second recess 62E. With regard to the motor 20E, configurations other than the configuration described above are similar to the configurations of the motor 20 according to the first preferred embodiment; therefore, the description thereof will not be given here.

Figure 10:
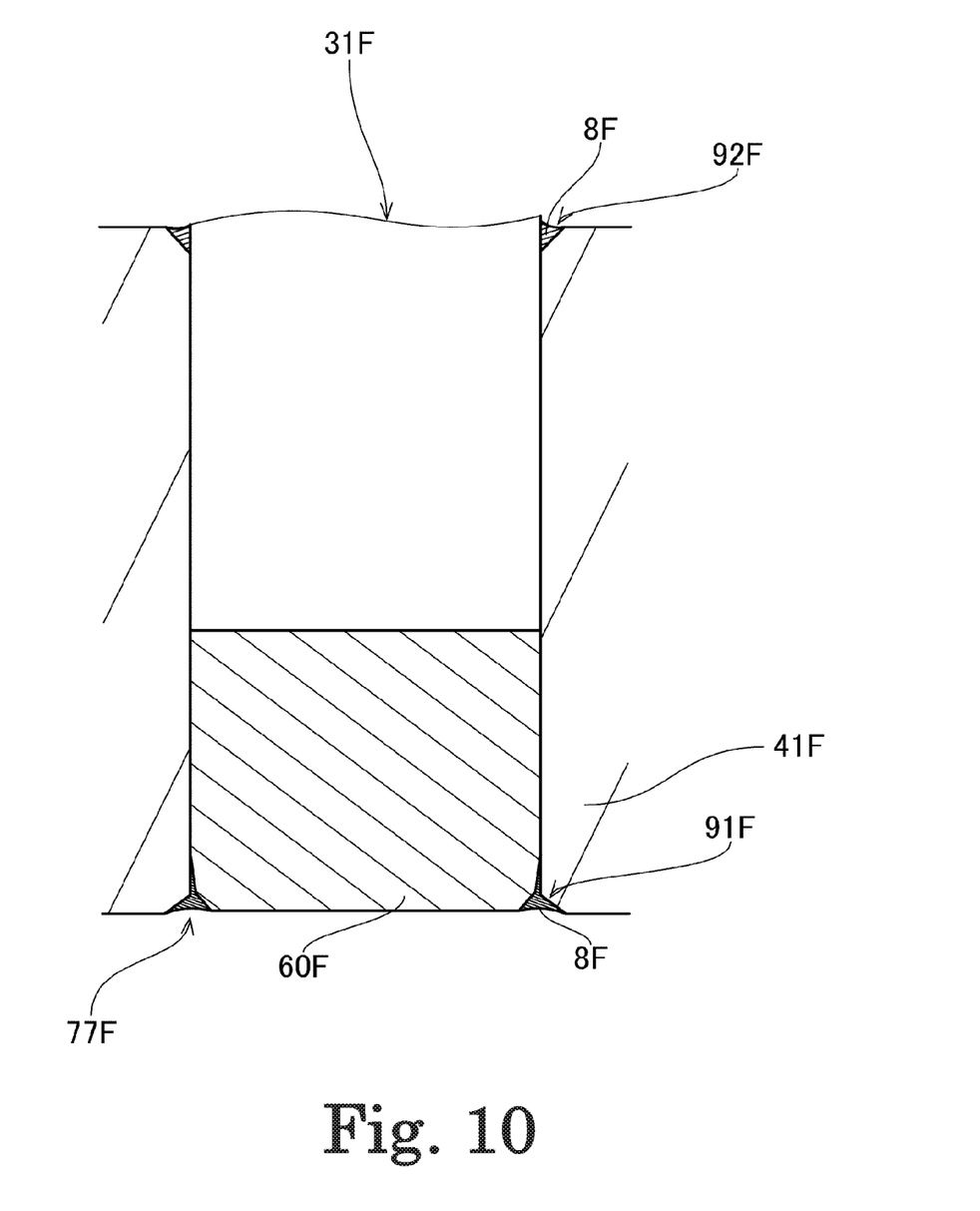
FIG. 10 is an enlarged sectional view of and around a through hole in the motor according to the third preferred modification.

FIG. 10 is an enlarged sectional view of and around the through hole 45E in the motor 20E according to the third modification. As illustrated in FIG. 10, the base 41F has an annular first groove 91F formed, at a lower surface side of the base 41F, between the base 41F and the sealing member 60F. The annular first groove 91F may be entirely applied with an adhesive 8F. The base 41F also has an annular second groove 92F formed, at an upper surface side of the base 41F, between the base 41F and the bearing mechanism 30F. The annular second groove 92F may be entirely applied with the adhesive 8F.

The groove 91F or 92F in the base 41F easily holds the adhesive 8F between the sealing member 60F or bearing mechanism 30F and the base 41F. With this configuration, the adhesive 8F is applied in large amounts between the sealing member 60F or bearing mechanism 30F and the base 41F. This configuration leads to an enhanced effect of sealing with the adhesive 8F. The first groove 91F may be formed in the base 41F or may be formed in the sealing member 60F. Moreover, the second groove 92F may be formed in the base 41F or may be formed in the bearing mechanism 30F.

A boundary 77F is defined between the base 41F and the sealing member 60F. The boundary 77F may be circumferentially welded. Thus, the base 41F and the sealing member 60F are bonded together and this bonding prevents the leakage of gas from the housing. The boundary 77F may be welded at one of the lower surface side and upper surface side of the base 41F. The boundary 77F may be welded at both the upper surface side and lower surface side of the base 41F. Alternatively, the boundary 77F may be welded at one of the upper surface side and the lower surface side, and a groove formed in the other surface side may be applied with the adhesive 8F.

A material for the base is preferably the same as a material for the sealing member. As a result, the material for the sealing member becomes almost identical in thermal expansion coefficient to the material for the base. This configuration prevents formation of an interstice between the outer circumferential portion of the sealing member and the inner circumferential portion that forms the through hole in the base even if a change in temperature around the motor occurs. Accordingly, this configuration prevents the leakage of gas from the housing even if a change in temperature around the motor occurs. The material for the base may be different from the material for the sealing member as long as these materials are almost identical in thermal expansion coefficient to each other.

One of the outer circumferential surface of the sealing member and the inner circumferential surface that forms the through hole in the base may be larger in surface roughness than the other circumferential surface. With this configuration, the adhesive is easily held at the clearance between the outer circumferential surface of the sealing member and the inner circumferential surface of the through hole.

The detailed shape of any member may be different from the shape thereof as illustrated in the accompanying drawings of the present application. Moreover, the features of the foregoing preferred embodiments and modifications may be combined appropriately as long as no conflict arises.

Exemplary preferred embodiments of the disclosure are applicable to, for example, a spindle motor and a disk drive apparatus.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor used in a disk drive apparatus to drive a disk, the disk drive apparatus including a housing defining an interior space, the spindle motor comprising:
   a bearing mechanism including a shaft having a center axis as a center thereof;
   a sealing member on a lower side of the bearing mechanism;
   a stationary portion including a base defining a portion of the housing; and
   a rotary portion arranged to rotate relative to the stationary portion about the center axis via the bearing mechanism,
   wherein
   the base has a through hole defined therein so as to have a center aligned with the center axis and pass through the base in an axial direction,
   the bearing mechanism is fixed to the base in a first fixing region defined between an inner circumferential portion that defines the through hole in the base and an outer circumferential portion of the bearing mechanism,
   the sealing member is fixed to the base in a second fixing region defined between the inner circumferential portion of the base and an outer circumferential portion of the sealing member, and
   at least one of the first fixing region and the second fixing region includes a sealing region where the through hole is closed.

2. The spindle motor according to claim 1, wherein
   the first fixing region includes a first sealing region circumferentially applied with an adhesive for blocking a clearance between the inner circumferential portion of the base and the outer circumferential portion of the bearing mechanism.

3. The spindle motor according to claim 1, wherein
   the second fixing region includes a second sealing region circumferentially applied with an adhesive for blocking a clearance between the inner circumferential portion of the base and the outer circumferential portion of the sealing member.

4. The spindle motor according to claim 1, wherein
   the inner circumferential portion that forms the through hole in the base has, at a lower surface side of the base, an annular protrusion protruding inward in a radial direction,
   the sealing member is smaller in outer diameter than the bearing mechanism, and
   the outer circumferential portion of the sealing member is fitted into an inner circumferential portion of the protrusion.

5. The spindle motor according to claim 1, wherein
   the inner circumferential portion that defines the through hole in the base has, at a lower surface side of the base, an annular first recess extending outward in a radial direction,
   the sealing member is larger in outer diameter than the bearing mechanism, and
   the outer circumferential portion of the sealing member is fitted into an inner circumferential portion of the first recess.

6. The spindle motor according to claim 5, wherein
   the sealing member is fixed in a third fixing region defined between an upper surface of the sealing member and an axially downward surface of the first recess, and
   the third fixing region includes a third sealing region circumferentially applied with an adhesive for blocking a clearance between the axially downward surface of the first recess and the upper surface of the sealing member.

7. The spindle motor according to claim 1, wherein
the inner circumferential portion that defines the through hole in the base has, at a lower surface side of the base, an annular second recess extending outward in a radial direction and upward in the axial direction,
the sealing member includes a flat plate portion of a discus shape and an annular tube portion extending in the axial direction from an end of the flat plate portion,
the flat plate portion is larger in outer diameter than the bearing mechanism, and
the annular tube portion has an outer circumferential portion fitted into an inner circumferential portion of the second recess.

8. The spindle motor according to claim 7, wherein
the sealing member is fixed in a third fixing region defined between an upper surface of the annular tube portion and an axially downward surface of the second recess, and
the third fixing region includes a third sealing region circumferentially applied with an adhesive for blocking a clearance between the axially downward surface of the second recess and the upper surface of the sealing member.

9. The spindle motor according to claim 1, wherein
the base has an annular first groove defined between the base and the sealing member at a lower surface side of the base, and
the annular first groove is entirely applied with an adhesive.

10. The spindle motor according to claim 1, wherein
a boundary between the outer circumferential portion of the sealing member and the inner circumferential portion that defines the through hole in the base is circumferentially welded at a lower surface side of the base.

11. The spindle motor according to claim 1, wherein
the base has an annular second groove defined between the base and the bearing mechanism at an upper surface side of the base, and
the annular second groove is entirely applied with an adhesive.

12. The spindle motor according to claim 1, wherein
a boundary between the outer circumferential portion of the bearing mechanism and the inner circumferential portion that defines the through hole in the base is circumferentially welded at an upper surface side of the base.

13. The spindle motor according to claim 1, wherein
the outer circumferential portion of the bearing mechanism is fixed by press fitting to the inner circumferential portion that defines the through hole in the base.

14. The spindle motor according to claim 1, wherein
a material for the sealing member is almost identical in thermal expansion coefficient to a material for the base.

15. A disk drive apparatus comprising:
a spindle motor configured to rotate a disk, the spindle motor including:
  a bearing mechanism including a shaft having a center axis as a center thereof;
  a sealing member on a lower side of the bearing mechanism;
  a stationary portion including a base defining a portion of the housing; and
  a rotary portion arranged to rotate relative to the stationary portion about the center axis via the bearing mechanism;
an access unit configured to perform at least one of data read from and data write to the disk;
a clamper configured to clamp the disk in conjunction with the spindle motor; and
a housing having a top cover and accommodating the disk, the spindle motor, the access unit, and the clamper, wherein
the base has a through hole defined therein so as to have a center aligned with the center axis and pass through the base in an axial direction,
the bearing mechanism is fixed to the base in a first fixing region defined between an inner circumferential portion that defines the through hole in the base and an outer circumferential portion of the bearing mechanism,
the sealing member is fixed to the base in a second fixing region defined between the inner circumferential portion of the base and an outer circumferential portion of the sealing member, and
at least one of the first fixing region and the second fixing region includes a sealing region where the through hole is closed.

* * * * *